US009191262B2

(12) United States Patent
Kuzmack et al.

(10) Patent No.: US 9,191,262 B2
(45) Date of Patent: Nov. 17, 2015

(54) NETWORK COMMUNICATION PROTOCOL PROCESSING OPTIMIZATION SYSTEM

(71) Applicant: Dell Products L.P., Round Rock, TX (US)

(72) Inventors: Eric Alan Kuzmack, Georgetown, TX (US); Hendrich M. Hernandez, Round Rock, TX (US); Robert Lee Winter, Burnet, TX (US); Geng Lin, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 454 days.

(21) Appl. No.: 13/774,158

(22) Filed: Feb. 22, 2013

(65) Prior Publication Data

US 2014/0244814 A1 Aug. 28, 2014

(51) Int. Cl.
*G06F 15/16* (2006.01)
*H04L 29/06* (2006.01)
*H04L 29/08* (2006.01)

(52) U.S. Cl.
CPC .......... *H04L 29/06006* (2013.01); *H04L 29/06* (2013.01); *H04L 29/08072* (2013.01); *H04L 69/12* (2013.01); *H04L 69/163* (2013.01)

(58) Field of Classification Search
CPC .......................... H04L 29/08072; H04L 29/06
USPC .................. 709/224, 228, 232; 370/352, 392
See application file for complete search history.

(56) References Cited

U.S. PATENT DOCUMENTS

| 7,961,712 B2* | 6/2011 | Rabenko et al. ............... 370/352 |
| 7,991,008 B2 | 8/2011 | Winter |
| 8,370,483 B2* | 2/2013 | Choong et al. ................ 709/224 |
| 8,958,297 B1* | 2/2015 | Miller et al. ................... 370/235 |
| 2013/0114423 A1* | 5/2013 | Nicolas ......................... 370/252 |

OTHER PUBLICATIONS http://publib.boulder.ibm.com/infocenter/zos/v1r11/index.jsp?topic=/com.ibm.zos.r11.halz002/multselect.htm , Apr. 2010.

* cited by examiner

*Primary Examiner* — Khanh Dinh
(74) *Attorney, Agent, or Firm* — Haynes and Boone, LLP

(57) ABSTRACT

A protocol processing system includes a plurality of communication interfaces. A control head-end is operable to receive a protocol processing engine identifier over a network through one of the communication interfaces from an external system. A plurality of optimized protocol processing engines are coupled to the control head-end, and the control head-end is operable to select a first optimized protocol processing engine from the plurality of optimized protocol processing engines that is identified by the protocol processing engine identifier. In response to being selected, the first optimized protocol processing engine handles communications between an application processing system and the external system. The first optimized protocol processing engine may be an optimized TCP/IP stack that receives operating system data through a first communication interface from the application processing system and sends network communication data over the network through the second communication interface to the external system.

17 Claims, 8 Drawing Sheets

NETWORK COMMUNICATION PROTOCOL PROCESSING OPTIMIZATION SYSTEM

BACKGROUND

The present disclosure relates generally to information handling systems, and more particularly to a protocol processing optimization system used for information handling system network communications.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs communicate with each other over networks using communication protocols. The Internet protocol suite refers to the set of communications protocols used for the Internet and similar networks, and is commonly referred to as the TCP/IP stack in an IHS in reference to the first networking protocols it defined: Transmission Control Protocol (TCP) and Internet Protocol (IP). Conventionally, TCP/IP stacks have been co-resident with operating systems on any information handling system that required communication services. This intertwining of network communication protocol stacks and operating systems was a choice made by early developers working with one processing resource in the IHS (e.g., one processor and one memory device) in order to achieve desired speed and efficiency for the IHS.

Today, there are many application-specific enhancements and offloads (e.g., stateful offloads (e.g., transmission control protocol (TCP) or Internet protocol (IP) offloads that keep track of the protocol connection state) and stateless offloads (e.g. offloads that do checksumming, large segmentation handling for TCP, etc.) that offload work from the host CPU) that may be implemented in TCP/IP stacks. With conventional client/server models, a TCP/IP stack on one platform may communicate with a TCP/IP stack on any of a plurality of other platforms, ensuring that a single TCP/IP stack instance will not be fully optimized to provide superior application performance over the network using TCP/IP for every type of service and/or offload that may be desired. Enhancements that have been proposed to TCP/IP that adapt it to better performance for specific applications or application scenarios become a burden to carry over on every TCP/IP stack release or revision. No conventional IHS TCP/IP stack will have all the enhancements or implement all the TCP/IP Requests For Comment (RFCs), as it is simply not practical to provide a "super" TCP/IP on every IHS. Furthermore, some enhancements for TCP/IP may be counter-productive (e.g., a TCP stack that does small message passing will not require a large maximum transmission unit (MTU) enhancement.)

Accordingly, it would be desirable to provide an improved network communication system.

SUMMARY

According to one embodiment, a protocol processing system includes a first communication interface that is operable to couple to an application processing system; at least one second communication interface that is operable to couple to a network; a control head-end that is operable to receive a protocol processing engine identifier through the at least one second communication interface from an external system over the network; and a plurality of optimized protocol processing engines coupled to the control head-end, wherein the control head-end is operable to select a first optimized protocol processing engine of the plurality of optimized protocol processing engines that is identified by the protocol processing engine identifier, wherein in response to being selected, the first optimized protocol processing engine handles communications between the application processing system and the external system.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
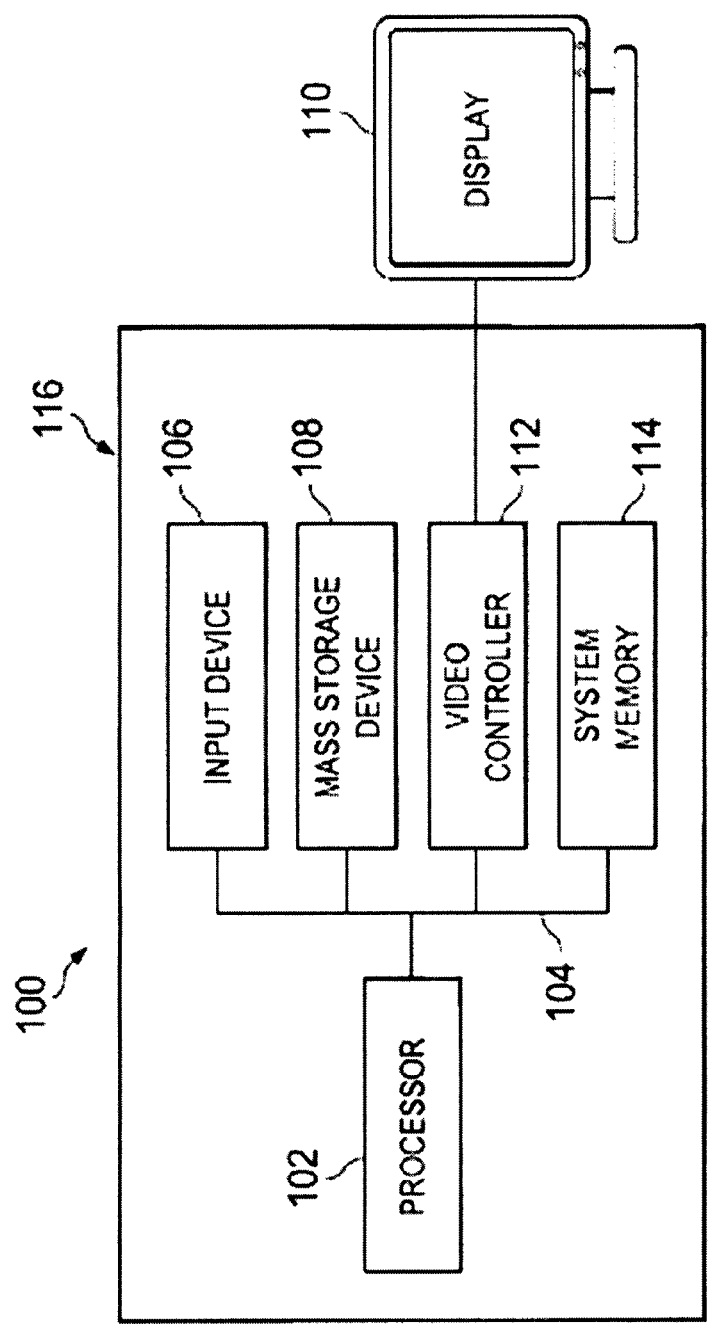
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
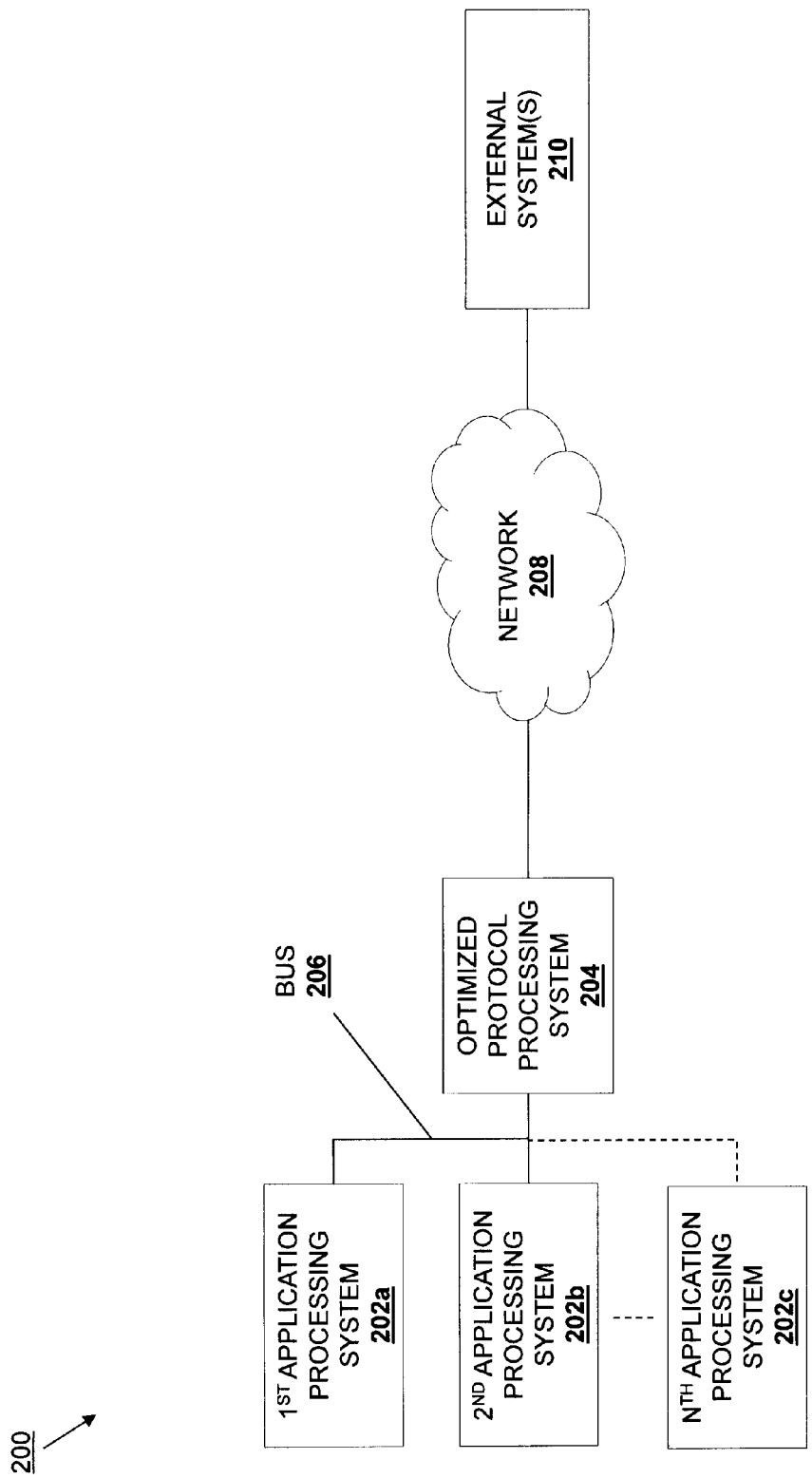
FIG. 2 is a schematic view illustrating an embodiment of a networked system.

Referring now to FIG. 2, an embodiment of a networked system 200 is illustrated. The networked system 200 includes a plurality of application processing systems such as the first application processing system 202*a*, the second application processing system 202*b*, and up to the N$^{th}$ application processing system 202*c* in the illustrated embodiment. Each of the application processing systems 202*a*, 202*b*, and 202*c* are coupled to an optimized protocol processing system 204 by a bus 206 which may be a high speed bus such as, for example, a peripheral component interconnect express (PCIe) bus, a Universal Serial Bus (USB), a Thunderbolt bus available from Intel® Corporation, and/or a variety of other buses known in the art. The optimized protocol processing system 204 is coupled to a network 208 such as, for example, a Local Area Network (LAN), a Storage Area Network (SAN), the Internet, a WiFi network, and/or a variety of other networks known in the art. The network 208 is coupled to one or more external systems 210.

As discussed in further detail below, the systems and methods of the present disclosure provide an architecture in which network communication services are split from application processing services. In some embodiments, the application processing systems and from the optimized protocol processing system may each be located in separate chassis. For example, each of the application processing systems 202*a*, 202*b*, and/or 202*c* may be a separate server including an operating system, and the optimized protocol processing system 204 may be provided as a separate device that couples to any of the application processing systems 202*a*, 202*b*, and 202*c* through a PCIe bus (i.e., the bus 206), along with coupling to the network 208. In other embodiments, one or more of the application processing systems 202*a*, 202*b*, and 202*c* and the optimized protocol processing system 204 may be included in the same chassis. For example, a server chassis may include an application processing system that includes an operating system (e.g., the application processing system may be provided by a processing system in the server chassis executing a first set of instructions on a memory system in the server chassis), and that server may also include the optimized protocol processing system 204 (e.g., the optimized protocol processing system 204 may be provided by a processing system in the server chassis executing a second set of instructions on a memory system in the server chassis) that couples to the application processing system through a PCIe bus (i.e., the bus 206), along with coupling to the network 208. In either embodiment, the optimized protocol processing system 204 provides, upon demand, specific, high-quality, and optimized protocol processing engines (e.g., optimized TCP/IP stacks) to provide optimized network connections and data transfer between any of the application processing systems 202*a*, 202*b*, and 202*c* and an external system 210. While a few examples of the networked system 200 have been discussed, one of skill in the art will recognize that a wide variety of configurations and devices may be used to provide the networked system 200 while remaining within the scope of the present disclosure.

The one or more external systems 210 coupled to the network 208 may include conventional systems or systems according to the teachings of the present disclosure. For example, any of the one or more external systems 210 may include conventional servers that include an operating system and a network communication system (e.g. a TCP/IP stack coupled to a communication interface) that is co-resident with the operating system. In another example, any of the external systems 210 may include one or more application processing systems (e.g., similar to the application processing systems 202*a*, 202*b*, and 202*c*) and an optimized protocol processing system (e.g., similar to the optimized processing system 204) that operate as described below. In an embodiment, any of the one or more external systems 210 may be the IHS 100 or include some or all of the components of the IHS 100 discussed above with reference to FIG. 1.

Figure 3:
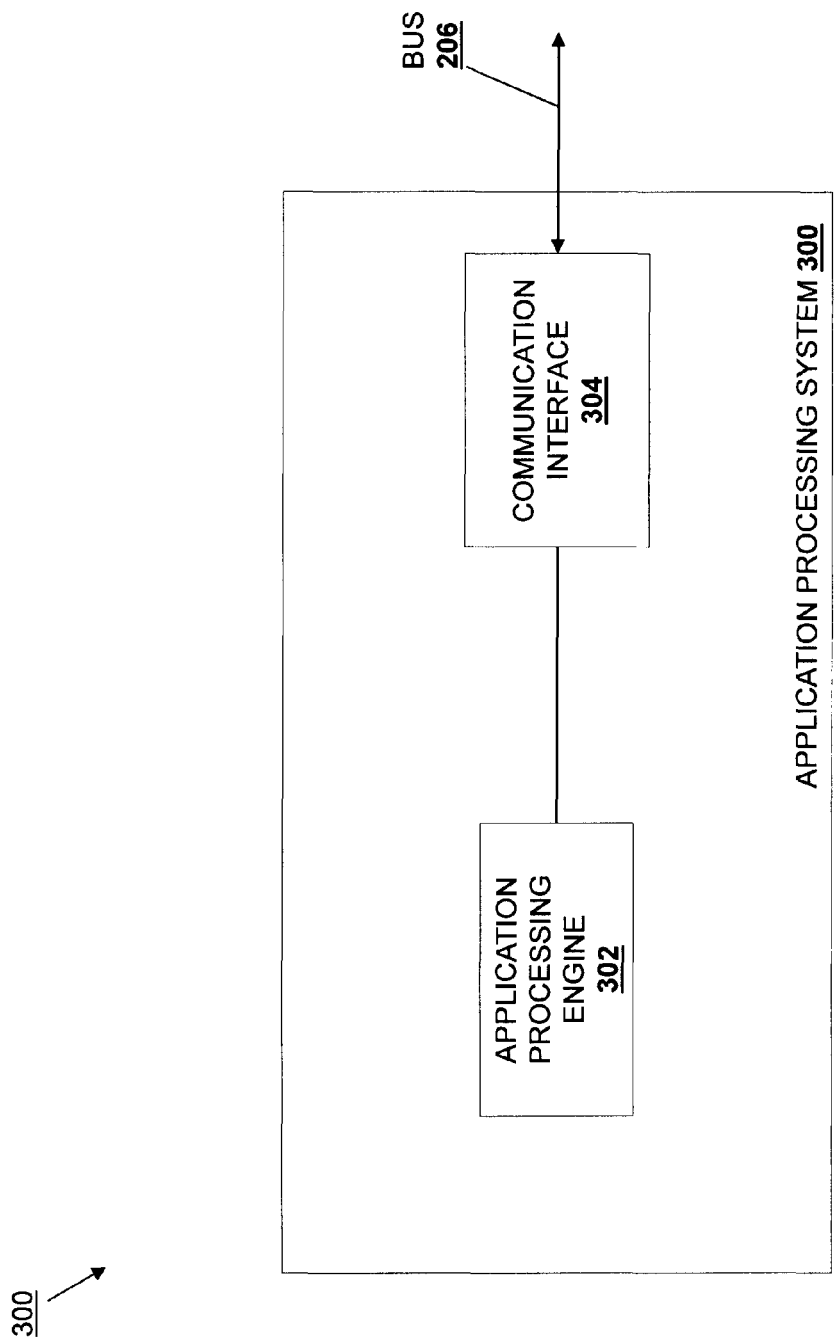
FIG. 3 is a schematic view illustrating an embodiment of an application processing system used in the networked system of FIG. 2.

Referring now to FIG. 3, an embodiment of an application processing system 300 is illustrated. The application processing system 300 is an example of one of the application processing systems 202*a*, 202*b*, and/or 202*c* discussed above with reference to FIG. 2. In an embodiment, the application processing system 300 may be the IHS 100 or include some or all of the components of the IHS 100 discussed above with reference to FIG. 1. The application processing system 300 includes an application processing engine 302 that may include instruction that are stored on a memory system and that, when executed by a processing system, cause the processing system to perform the functions of the application processing engine 302. In the examples discussed below, the application processing engine 302 is an operating system. However, in other embodiments, the application processing engine 302 may include scientific applications, data driven applications, compute-intensive applications, and/or a variety of other application processing engines known in the art.

The application processing engine 302 is coupled to a communication interface 304 that is coupled to the bus 206. In an embodiment, the communication interface 304 is a basic input/output (I/O) interface such as, for example, a "raw Ethernet" interface, a Peripheral Component Interconnect express (PCIe) interface, an unformatted information serial stream interface, and/or a variety of other basic I/O interfaces that are operable to provide communications from the application processing engine 302 to the bus 206. Application processing is the primary responsibility of application processing systems such as, for example, servers and/or other compute resources. Communication services are necessary for the majority of applications but can detract from the proper use of the application processing system 300 or other compute resource. Additionally, the combining of application processing engines, such as operating systems, with networking capabilities within the application processing system (e.g. a server or other computer resource) produces administrative domain conflicts and can blur function and responsibility. Thus, in some embodiments, the application processing system 300 may benefit from the teachings of the present disclosure in that the application processing system 300 may not include a network communication protocol processing engine that is used to provide communication services, thus separating the application processing from the communication services. For example, the application processing engine 302 may be an operating system that provides raw operating system data (e.g., an unformatted data stream or streams) through a basic I/O communication interface 304 to transmit that raw operating system data over a PCIe bus 206. However, in other embodiments, the application processing system 300 may include one or more network communication protocol processing engines (e.g., in such a scenario, the one or more network protocol processing engines included in the application processing system 300 may not be optimized for all desired communications scenarios.) While a few examples of application processing systems have been provided, one of skill in the art will recognize that a wide variety of application processing systems will fall within the scope of the present disclosure.

Figure 4:
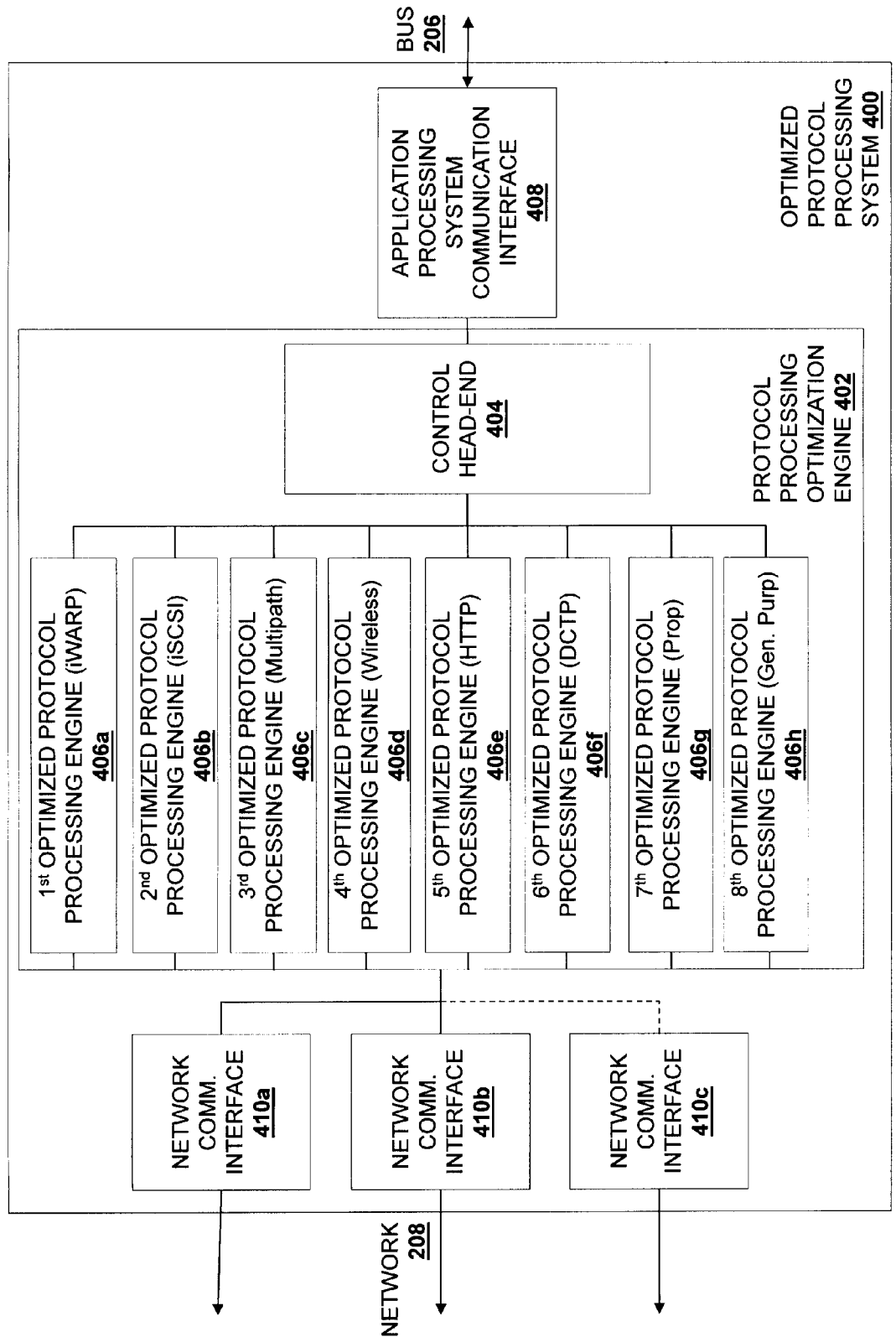
FIG. 4 is a schematic view illustrating an embodiment of an optimized protocol processing system used in the networked system of FIG. 2.
Figure 5:
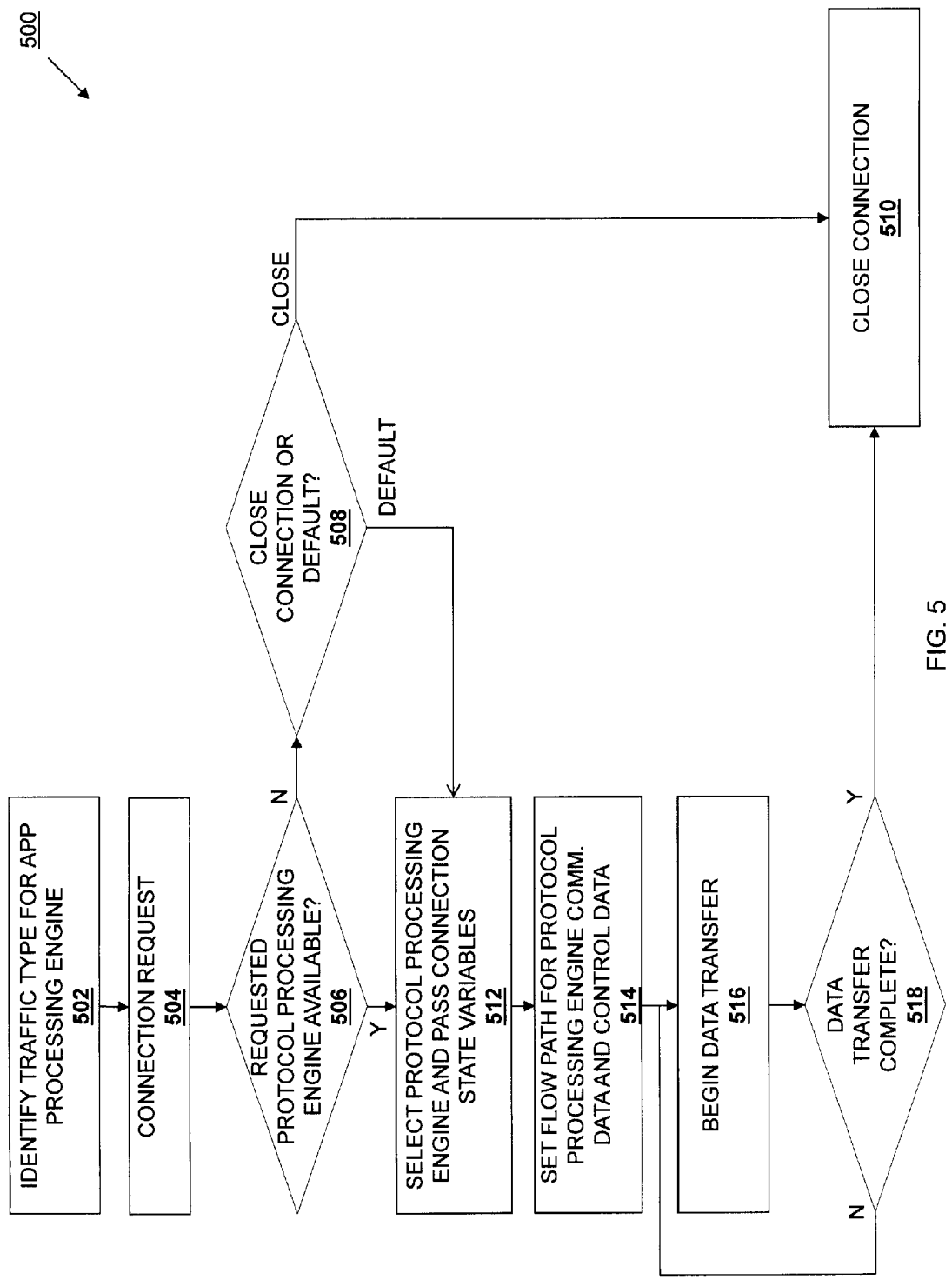
FIG. 5 is a flow chart illustrating an embodiment of a method for network communications.

Referring now to FIG. 4, an embodiment of an optimized protocol processing system 400 is illustrated. The optimized protocol processing system 400 is an example of the optimized protocol processing system 204 discussed above with reference to FIG. 2. In an embodiment, the optimized protocol processing system 400 may be the IHS 100 or include some or all of the components of the IHS 100 discussed above with reference to FIG. 1. The optimized protocol processing system 400 includes a protocol processing optimization engine 402 that includes a control head-end 404 and a plurality of optimized protocol processing engines 406a, 406b, 406c, 406d, 406e, 406f, 406g, and 406h. In an embodiment, any or all of the protocol processing optimization engine 402, the control head-end 404, and the plurality of optimized protocol processing engines 406a-h may be provided as instruction on a memory system that, when executed by a processing system cause the processing system to perform the functions discussed below. As discussed in further detail below, the control head-end 404 operates to configure an optimized protocol processing engine selected from the plurality of optimized protocol processing engines 406a-h to handle communications between an external system 210 and any of the application processing systems 202a, 202b, and 202c. As further discussed below, each of the plurality of optimized protocol processing engines 406a-h includes enhancements and/or application specific improvements to optimize the external system/application processing system communications.

In the illustrated embodiment, the first optimized protocol processing engine 406a has been optimized for the Internet Wide Area Remote Direct Memory Access (RDMA) Protocol (iWARP). For example, the first optimized protocol processing engine 406a may be a TCP/IP stack that includes iWARP TCP enhancements and/or improvements such as, for example, stack-to-stack communication efficiencies for node-to-node transmission. In the illustrated embodiment, the second optimized protocol processing engine 406b has been optimized for the Internet Small Computer System Interface (iSCSI). For example, the second optimized protocol processing engine 406b may be a TCP/IP stack that includes iSCSI TCP/IP enhancements and/or improvements such as, for example, TCP fast re-transmit according to RFC 2581 and delayed acknowledge packets according to RFC 1122. In the illustrated embodiment, the third optimized protocol processing engine 406c has been optimized for Multipath TCP. For example, the third optimized protocol processing engine 406c may be a TCP/IP stack that includes Multipath TCP enhancements and/or improvements according to RFC 6182. In the illustrated embodiment, the fourth optimized protocol processing engine 406d has been optimized for Wireless TCP. For example, the fourth optimized protocol processing engine 406d may be a TCP/IP stack that includes Wireless TCP enhancements and/or improvements according to RFC 2001 and other RFCs related to Wireless TCP. In the illustrated embodiment, the fifth optimized protocol processing engine 406e has been optimized for Hypertext Transfer Protocol (HTTP). For example, the fifth optimized protocol processing engine 406e may be a TCP/IP stack that includes HTTP enhancements and/or improvements. In the illustrated embodiment, the sixth optimized protocol processing engine 406f has been optimized for Data Center TCP (DCTP). For example, the sixth optimized protocol processing engine 406f may be a TCP/IP stack that includes DCTP enhancements and/or improvements such as, for example, enhanced congestion notification according to RFC 3168. In the illustrated embodiment, the seventh optimized protocol processing engine 406g has been optimized for proprietary TCP enhancements and/or improvements. In the illustrated embodiment, the eighth optimized protocol processing engine 406h has been optimized for general purpose TCP/IP.

While a few examples of optimized protocol processing engines have been described above, one of skill in the art will recognize that these are only a few of the known specific modifications to TCP/IP to support applications and application scenarios. As many more specific modifications to TCP/IP to support applications and application scenarios are anticipated in the future, it should be understood that a wide variety of optimized protocol processing engines may be implemented in the architecture discussed herein to facilitate modifications and enhancements to TCP/IP. For example, optimized protocol processing engines may be optimized for live migration or VMotion (available from VMWare, Inc.) TCP enhancements or improvements such as, for example, enhancements that provide for the handling of large data movement, fast retransmit to eliminate excessive acknowledgments (AKCs) (e.g., such as those used in the Internet Small Computer System Interface), long connection timeouts for wireless networks, small packet optimization for message passing stacks, elimination of TCP and IP checksum over lossless data link layer networks, and/or a variety of other optimization characteristics known in the art. Furthermore, while the examples discussed herein are directed to TCP/IP stack optimization, other protocol processing engines such as, for example, those used for open shortest path first (OSPF), virtual extensible local area network (VxLAN), network virtualization using generic routing encapsulation (NV-GRE), routing information protocol (RIP), border gateway protocol (BGP), Internet protocol version 6 (IPv6), stream control transmission protocol (SCTP), Banyan virtual integrated network services (VINES), 802.1Qbb/az/au data center bridging (DCB) and other layer 2 (L2) state machines, InfiniBand (IB) transport, Internet wide area remote direct access memory (RDMA) Potocol (iWARP), RDMA over converged Internet (RoCE), and/or a variety of other protocol processing engines will fall within the scope of the present disclosure.

The protocol processing optimization engine 402 is coupled to an application processing system communication interface 408 that is coupled to the bus 206, and to a plurality of network communication interfaces 410a, 410b, and 410c that are coupled to the network 208. In the embodiment illustrated in FIG. 4, the control head-end 404 is shown as being coupled to the application processing system communication interface 408, while the optimized protocol processing engines 406a-h are illustrated as being coupled to each of the network communication interfaces 410a, 410b, and 410c. However, as discussed below, the control head-end 404 is also coupled to and operable to communicate via each of the network communication interfaces 410a, 410b, and 410c, while each of the optimized protocol processing engines 406a-h are coupled to and operable to communicate via the application processing system communication interface 408.

In an embodiment, the application processing system communication interface 408 is a basic input/output (I/O) interface such as, for example, an interface for transmitting an unformatted data stream or streams, and/or a variety of other basic I/O interfaces that are operable to receive communications from the application processing engine 302 over the bus 206. For example, the control head-end 404 and/or any of the optimized protocol processing engines 406a-h may receive raw operating system data through a basic I/O communication interface 408 that is transmitted over a PCIe bus 206 by any of the application processing systems 202a, 202b, and 202c. In an embodiment, the network communication interfaces 410a, 410b, and 410c may include any of a Network Interface Controller or Card (NIC), a LAN On Motherboard (LOM), a network daughter card (NDC), a converged network adapter (CAN), a host bus adapter (HBA) such as a fiber channel HBA, a host channel adapter (HCA) such as a IB HCA, and/or a variety of other network communication interfaces known in the art for communicating over a network. For example, the control head-end 404 and/or any of the optimized protocol processing engines 406a-h may receive network communication data through any of the network communication interfaces 410a, 410b, and/or 410c that is transmitted over the network 208 by an external system 210. While only three network communication interfaces 410a, 410b, and 410c are illustrated, any number of network communication interfaces are envisioned as falling within the scope of the present disclosure.

Referring now to FIGS. 2, 3, 4, and 5, a method 500 for network communications is illustrated. The method 500 begins at block 502 where a traffic type for an application processing engine is determined. In an embodiment, at block 502, any of the application processing systems 202a, 202b, or 202c may communicate (e.g., using the application processing engine 302 and through the communication interface 304) over the bus 206 to the optimized protocol processing system 204. That communication may include information identifying a data traffic type requested by the application processing engine 302. For example, an operating system/application processing engine 302 may communicate raw operating system data through a basic I/O communication interface 304 and over a PCIe bus 206 to the optimized protocol processing system 204 that requests a particular traffic type that is associated with a particular optimized protocol processing engine. At block 502, that request is received by the optimized protocol processing system 204 (e.g., by the control head-end 404 through the application processing system communication interface 408) and used to identify the optimized protocol processing engine associated with the traffic type that the application processing engine 302 is requesting. In an embodiment, a protocol may be defined for communication over the basic I/O communication interface 304 such that the optimized protocol processing system 204 can identify the traffic type (e.g., the raw data transmitted over the basic I/O communication interface 304 may include a unique sequence of bits in the unformatted data stream that identifies a structure for the data that follows).

The method 500 then proceeds to block 504 where a connection request is received. As discussed in further detail below, in different embodiments, the connection of an external system 210 and any of the application processing systems 202a, 202b, or 202c through the optimized protocol processing system 204 may be initiated by the optimized protocol processing system 204 or serviced by the optimized protocol processing system 204 in response to an initiation by the external system 210. In those different embodiments, block 504 and decision block 506 are different. Thus, each of those embodiments are described separately below, followed by a common description for the remaining method blocks.

Figure 6:
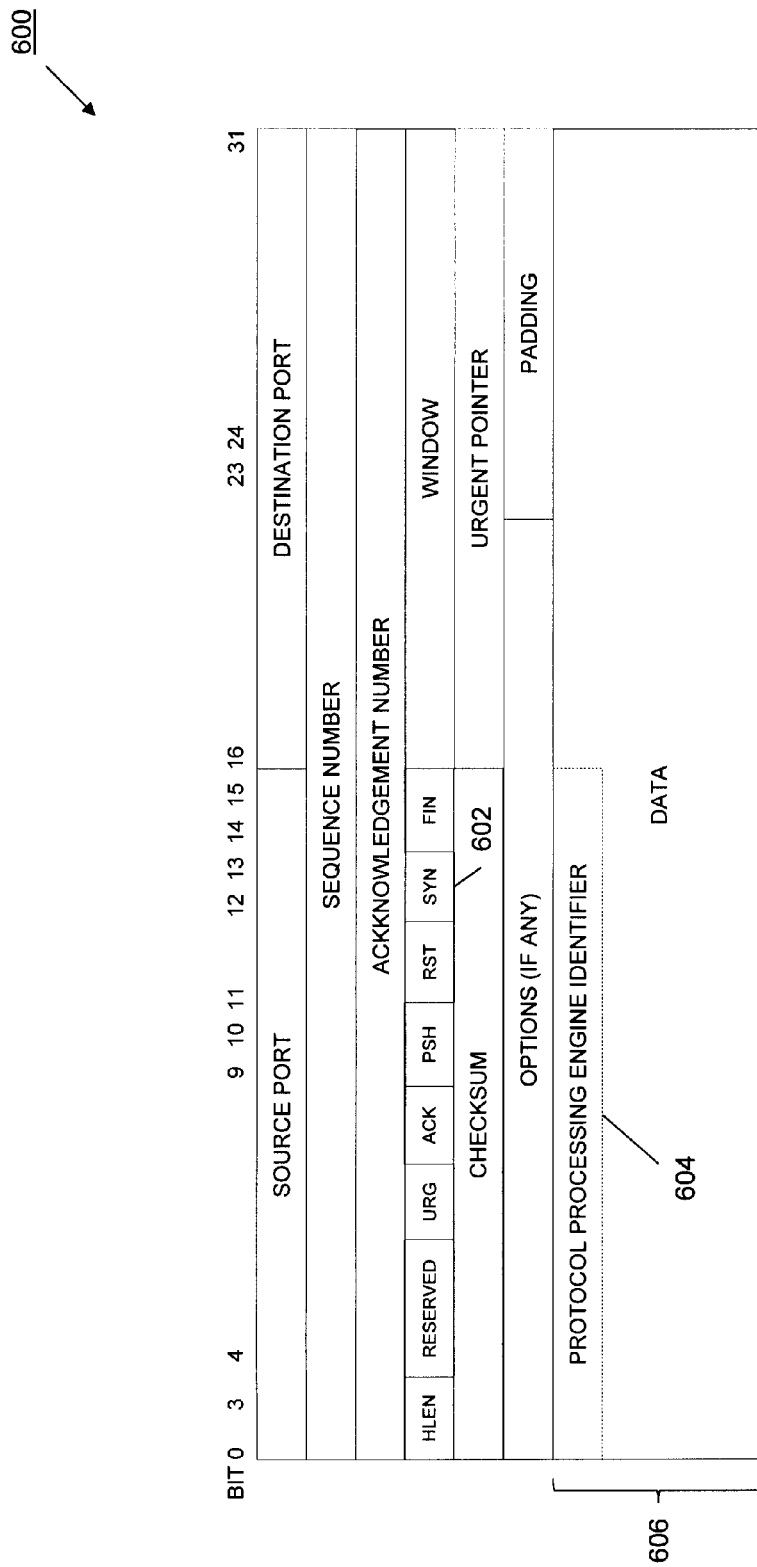
FIG. 6 is a graphical view illustrating an embodiment of a packet.

Referring now to FIG. 6, an embodiment of a packet 600 is illustrated that may be used to perform the connection request at block 504. One of skill in the art will recognize that the packet 600 in the illustrated embodiment is a TCP packet. However, other packet types are envisioned as falling within the scope of the present disclosure. The use of a TCP packet to identify the TCP stack of a connection is described in detail in U.S. Pat. No. 7,991,008 (hereafter "the '008' patent), invented by a co-inventor of the present disclosure, Robert L. Winter, and assigned to the assignee of the present disclosure, Dell Products L.P., the disclosure of which is incorporate by reference herein. The present disclosure builds upon the disclosure of the '008 patent by providing a protocol processing engine identifier (that identifies an optimized protocol processing engine) in the data field of a TCP packet that has been identified as a synchronization (SYN) packet due to the setting of a SYN bit in the TCP packet.

In an embodiment in which the connection of an external system 210 and one of the application processing systems 202a, 202b, or 202c through the optimized protocol processing system 204 is initiated by the external system 210, the connection request at block 504 is sent by the external system 210 and received by the optimized protocol processing system 204 over the network 208. For example, at block 504, the external system 210 may use a protocol processing engine such as, for example, a TCP/IP stack in the external system 210, to send the packet 600 over the network 208 to the optimized protocol processing system 204. In an embodiment, that packet 600 may request a specific application and/or or service of the application processing system 202a by designating the packet 600 a SYN packet through the setting of the SYN bit 602 and providing a protocol processing engine identifier 604 in a data field 606 of the packet 600. The table below illustrates a plurality of possible a protocol processing engine identifiers 604 that may be included in the data field 606 of the packet 600:

| 001 | iSCSI |
|---|---|
| 002 | iWARP |
| 003 | Multipath |
| 004 | Wireless |
| 005 | HTTP |
| 006 | DCTP |
| 007 | Live VM Migration |
| 200-999 | Proprietary |

One of skill in the art will recognize that the protocol processing engine identifiers in the table above are codes corresponding to the optimized TCP/IP stacks discussed above. However, codes for a variety of other optimized protocol processing engines are envisioned as falling within the scope of the present disclosure. At block 504, the control head-end 404 in the optimized protocol processing system 204 receives the packet 600 through one of the network communication interfaces 410a, 410b, or 410c, determines that the packet 600 is a SYN packet due to the setting of the SYN bit 602, and in response, reads the protocol processing engine identifier 604 from the data field 606 of the packet 600.

The method 500 then proceeds to decision block 506 where it is determined whether the requested protocol processing engine is available. At decision block 506, the control head-end 404 determines whether the plurality of optimized protocol processing engines 406a-h include the protocol processing engine identified by the protocol processing engine identifier 604. If the plurality of optimized protocol processing engines 406a-h include the protocol processing engine identified by the protocol processing engine identifier 604, the control head-end 404 sends a SYN packet that includes the protocol processing engine identifier 604 along with an acknowledge (ACK) packet back to the external system 210 over the network 208 through one of the network communication interfaces 410a, 410b, or 410c. Then, upon the control head-end 404 receiving an ACK packet back from the external system 210 over the network 208 through one of the network communication interfaces 410a, 410b, or 410c (i.e., completing a "3-way handshake"), the method 500 proceeds to block 512, discussed in further detail below.

In an embodiment in which the connection of an external system 210 and one of the application processing systems 202a, 202b, or 202c through the optimized protocol processing system 204 is initiated by the optimized protocol processing system 204, the optimized protocol processing system 204 first receives a request from one of the application processing systems 202a, 202b, or 202c for one of the optimized protocol processing engines 406a-h to handle communications between itself and an external system 210. For example, the control head-end 404 may receive the request from any of the application processing systems 202a, 202b, or 202c for one of the optimized protocol processing engines 406a-h through the application processing system communication interface 408 over the bus 206. In response, the control head-end 404 initiates the connection request at block 504 with the external system 210 requested by the application processing system 202a, 202b, or 202c by sending a packet 600 as a SYN packet through the setting of the SYN bit 602 and providing a protocol processing engine identifier 604 that identifies the optimized protocol processing engine requested by the application processing system 202a, 202b, or 202c in a data field 606 of the packet 600, similarly as discussed above.

The method 500 then proceeds to decision block 506 where it is determined whether the requested protocol processing engine is available. At decision block 506, if the external system 210 is operable to read the protocol processing engine identifier 604 sent by the optimized protocol processing system 204 in the SYN packet and includes the optimized protocol processing engine requested by the application processing system 202a, 202b, Or 202c, the external system 210 sends a SYN packet including the protocol processing engine identifier 604 in its data field 606, along with an ACK packet over the network 208 to the optimized protocol processing system 204. The optimized protocol processing system 204 receives the SYN packet including the protocol processing engine identifier 604 in its data field 606 back from the external system 210, the control head-end 404 determines that the requested protocol processing engine is available in the optimized protocol processing engines 406a-h at decision block 506, and the method 500 then proceeds to block 512, discussed in further detail below.

In either embodiment (a connection initiated by the external system 210 or a connection initiated by the optimized protocol processing system 204), if at decision block 506 it is determined that the requested protocol processing engine is not available (e.g., in the external system 210 or in the optimized protocol processing system 204), the method 500 proceeds to decision block 508 where it is determined whether to close the connection or use a default protocol processing engine. For example, the control head-end 404 may determine that the external system 210 has requested a protocol processing engine that is not one of the optimized protocol processing engines 406a-h, or that the external system 210 does not include the optimized protocol processing engine requested by the application processing system 202a, 202b, or 202c, and, in response, determine whether to close the connection or use a default protocol processing engine at decision block 508. If, at decision block 508, it is determined that the connection should be closed, the method 500 proceeds to block 510 where the connection is closed such that the application processing system 202a, 202b, or 202c and the external system 210 do not communicate, discussed in further detail below. If, at decision block 508, it is determined that a default protocol processing engine should be used, the method 500 proceeds to block 512.

At block 512, a protocol processing engine is selected and connection state variables are passed to that protocol processing engine. In an embodiment where block 512 is performed following a determination to use a default protocol processing engine at decision block 508, the eighth protocol processing engine 406h, illustrated as an optimized general purpose protocol processing engine, may be selected by the control head-end 404 and passed connection state variables. In an embodiment where the one of the optimized protocol processing engines 406a-h requested by the application processing system 202a, 202b, or 202c was determined at decision block 506 to be included in the external system 210, that optimized protocol processing engine may be selected by the control head-end 404 and passed connection state variables. In an embodiment, where the one of the optimized protocol processing engines 406a-h requested by the external system 210 was determined at decision block 506 to be included in the optimized protocol processing system 204, that optimized protocol processing engine may be selected by the control head-end 404 and passed connection state variables. In an embodiment, passing connection state variables may include transmitting the connection state of the external system 210 (e.g., the TCP/IP stack connection in the external system 210) to the selected optimized protocol processing engine. In an example, connection state variables for TCP may include options such as maximum segment size, window size, selective acknowledgements permitted, and TCP state machine states such as LISTEN, SYN-SENT, SYN-RECEIVED, ESTABLISHED, FIN-WAIT-1, FIN-WAIT-2, CLOSE-WAIT, CLOSING, LAST-ACK, TIME_WAIT, and CLOSED. These connection state variables may be passed from the control head-end 404 to the flow selected state in order to keep track of the connection state variables and what state the connection is in, while sequence numbers may be provided and maintained on the data inself The method 500 then proceeds to block 514 where a flow path is set for protocol processing engine communication data and control data. In an embodiment, the control head-end 404 then sets a flow path in the optimized protocol processing system 204 for the optimized protocol processing engine selected at block 512. The setting of the flow path in the optimized protocol processing system 204 includes setting flow rules to direct data communications and control communications received through one of the network communication interfaces 410a, 140b, or 410c to the selected optimized protocol processing engine. In an embodiment, the flow path is the path along the connection that the data will travel over (e.g., the physical port or ports that data is transmitted through.) In an embodiment, the setting of the flow path may include selecting one of the plurality of network communication interfaces 410a, 410b, or 410c by the optimized protocol processing engine selected at block 512. For example, the optimized protocol processing engine may select one of the plurality of network communication interfaces 410a, 410b, or 410c based on a type of data flow (e.g., similar to a TCP stack—one from column A, one from column B—to select the best pairing of level 3 and 4 (TCP/IP) and level 2 (NIC).

With the connection state variables passed to the selected optimized protocol processing engine and the flow path set in the optimized protocol processing system 204, the method 500 proceeds to block 516 where data transfer is begun, and then to decision block 518 where it is determined whether data transfer is complete. The setting of the flow path by the control head-end in block 512 results in all packets from a source to its destination being recognized and routed properly to the selected optimized protocol processing engine in the optimized protocol processing system 204. Following block 514, data transfer is performed between a protocol processing engine (e.g., a TCP/IP stack) in the external system 210 and one of the application processing systems 202a, 202b, and 202c through one of the optimized protocol processing engines 406a-h (e.g., an optimized TCP/IP stack) in the optimized protocol processing system 204. Data sent from an application processing system 202a, 202b, or 202c to the external system 210 is provided from the application processing engine 302, through the communication interface 304, over the bus 206, through the application processing system communication interface 408, over the flow path set at block 514 such that the communication is handled by one of the optimized protocol processing engines 406a-h and provided through one of the network communication interfaces 410a, 410b, or 410c, and then over the network to the external system 210. Likewise, data sent from the external system 210 to an application processing system 202a, 202b, or 202c is sent over the network 208 by the external system 210, received through one of the network communication interfaces 410a, 410b, or 410c, sent over the flow path set at block 514 such that the communication is handled by one of the optimized protocol processing engines 406a-h and provided through the application processing system communication interface 408, over the bus 206, through the communication interface 304, and to the application processing engine 302.

Such sending of data between the application processing system 202a, 202b, or 202c and an external system 210 occurs until the data transfer is determined to be complete at decision block 518, at which time the method 500 proceeds to block 510 where the connection is closed. In an embodiment, data transfer may be determined to be complete by the optimized protocol processing engine handling the communications/data transfer, resulting in the optimized protocol processing engine initiating the closing of the connection at block 510. In another embodiment, data transfer may be determined to be complete by the external system 210, resulting in the external system 210 initiating the closing of the connection at block 510. For example, when the session ends, the TCP/IP stack in the external system 210 may send a packet (similar to the packet 600 discussed above with reference to FIG. 6) that includes a set FIN bit to the optimized TCP/IP stack in the optimized protocol processing system 204. In either case, at block 510, the connection between the protocol processing engine (e.g., a TCP/IP stack) in the external system 210 and the optimized protocol processing engine (e.g., an optimized TCP/IP stack) in the optimized protocol processing system 204 is closed. Thus, in some embodiments, the control head-end is responsible for the connection open sequence, while the optimized protocol processing engine selected according to the method 500 is responsible for the connection close. One of Referring now to FIGS. 7a and 7b, particular embodiments of a networked system 700 that is similar to the networked system 200 discussed above with reference to FIG. 2 are illustrated. Each of the networked systems 700 include a first server 702 including an operating system 704 (i.e. an embodiment of an application processing engine) coupled to an I/O interface 704. Each of the networked systems 700 also include an optimized TCP/IP system 708 including an I/O interface 710. The optimized TCP/IP system 708 includes a TCP head-end (i.e., an embodiment of the control head-end) that is coupled to a plurality of optimized TCP/IP stacks 714 (i.e., an embodiment of the optimized protocol processing engines), with each of the TCP head-end 712 and the optimized TCP/IP stacks 714 coupled to the I/O interface 710 and a plurality of NICs 716. The NICs 716 couple the optimized TCP/IP system 708 to a network 718 that is also coupled to an external system 720. The external system includes a TCP/IP stack 722 that is coupled to a NIC 724 that couples the external system 720 to the network 718.

Figure 7A:
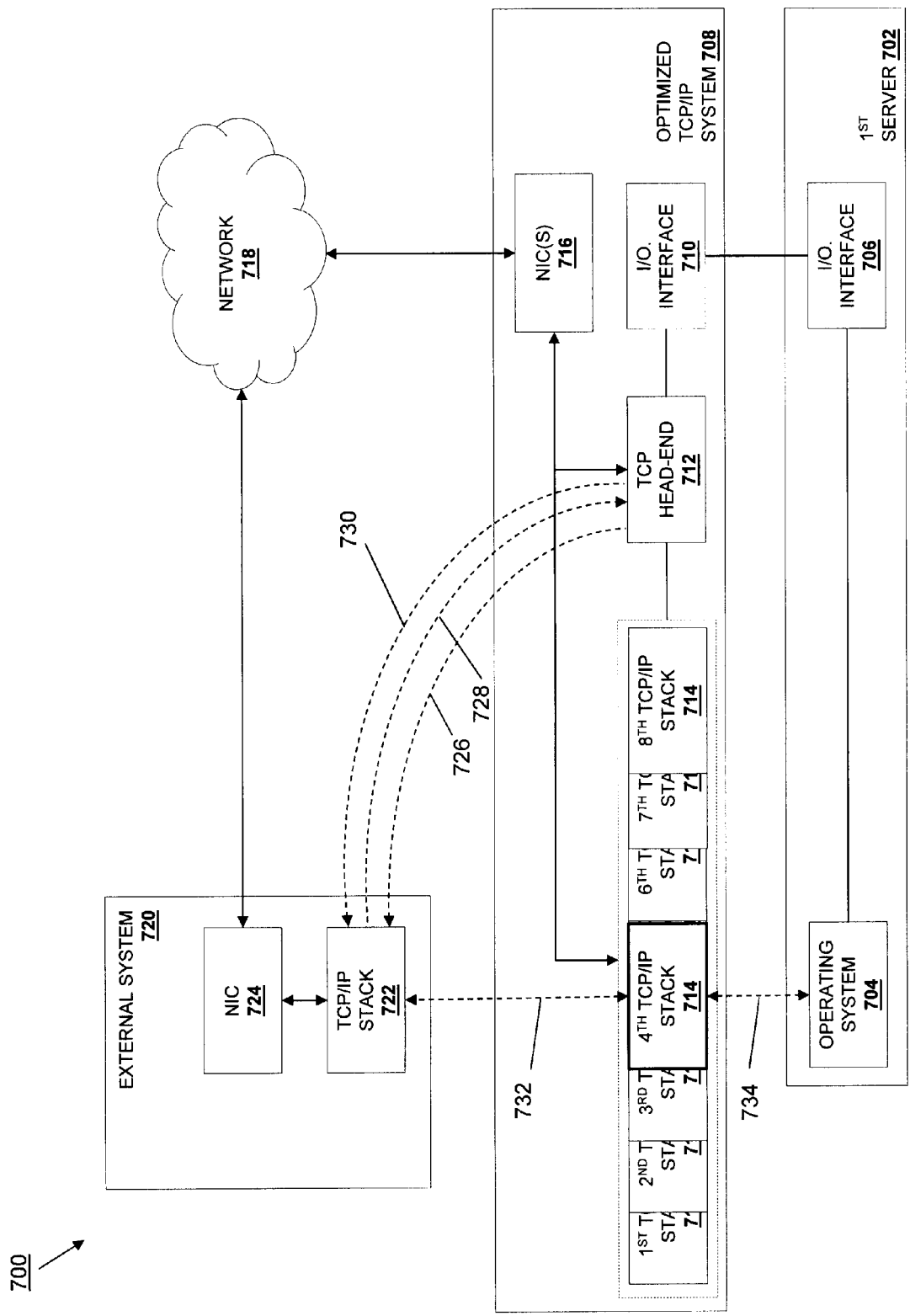
FIG. 7a is a schematic view illustrating an embodiment of a networked system operating according to an embodiment of the method of FIG. 6.

The embodiment of the networked system 700 of FIG. 7a illustrates the situation in which the connection between the external system 720 and the first server 702 is initiated by the optimized TCP/IP system 708. As illustrated and described above, in this embodiment, the operating system 704 requests the 4th optimized TCP/IP stack 714 to handle communications between itself and the external system 720 by sending that request through the I/O interface 706 and the I/O interface 710 to the TCP head-end 712 (e.g., the operating system 704 tells the TCP head-end 712 that it needs a TCP/IP stack optimized for iSCSI). In response, the TCP head-end 712 sends a SYN packet 726 identifying the 4th optimized TCP/IP stack 714 through the NIC 716, through the network 718, through the NIC 724, and to the TCP/IP stack 722 (e.g., the TCP head-end 712 asks the TCP/IP stack 722 if it is optimized for iSCSI). If the external system 720 includes the functionality to read the 4th optimized TCP/IP stack 714 identifier in the SYN packet 726 and the TCP/IP stack 722 is similar to the 4th optimized TCP/IP stack, the TCP/IP stack 722 sends a SYN packet 728 identifying the 4th optimized TCP/IP stack 714 along with an ACK packet 728 back through the NIC 724, over the network 718, through the NIC 716, and to the TCP head-end 712 (e.g., the TCP/IP stack 722 confirms that it is optimized for iSCSI). In response to receiving the SYN packet 728 identifying the 4th optimized TCP/IP stack 714 and ACK packet 728, the TCP head-end 712 sends an ACK packet 730 through the NIC 716, through the network 718, through the NIC 724, and to the TCP/IP stack 722 to complete a "3-way handshake". The TCP head-end 712 then selects the 4th optimized TCP/IP stack 714 (e.g., that is optimized for iSCSI), passes connection state variable to the 4th optimized TCP/IP stack 714 and sets the flow path in the optimized TCP/IP system 708 such that the 4th optimized TCP/IP stack 714 handles communication 732 and 734 between the operating system 704 and the TCP/IP stack 722 that occur through the I/O interface 706 and the I/O interface 710, are handled by the 4th optimized TCP/IP stack 714, sent through the NIC 716, over the network 208, through the NIC 724, and to the TCP/IP stack 722, and vice versa.

Figure 7B:
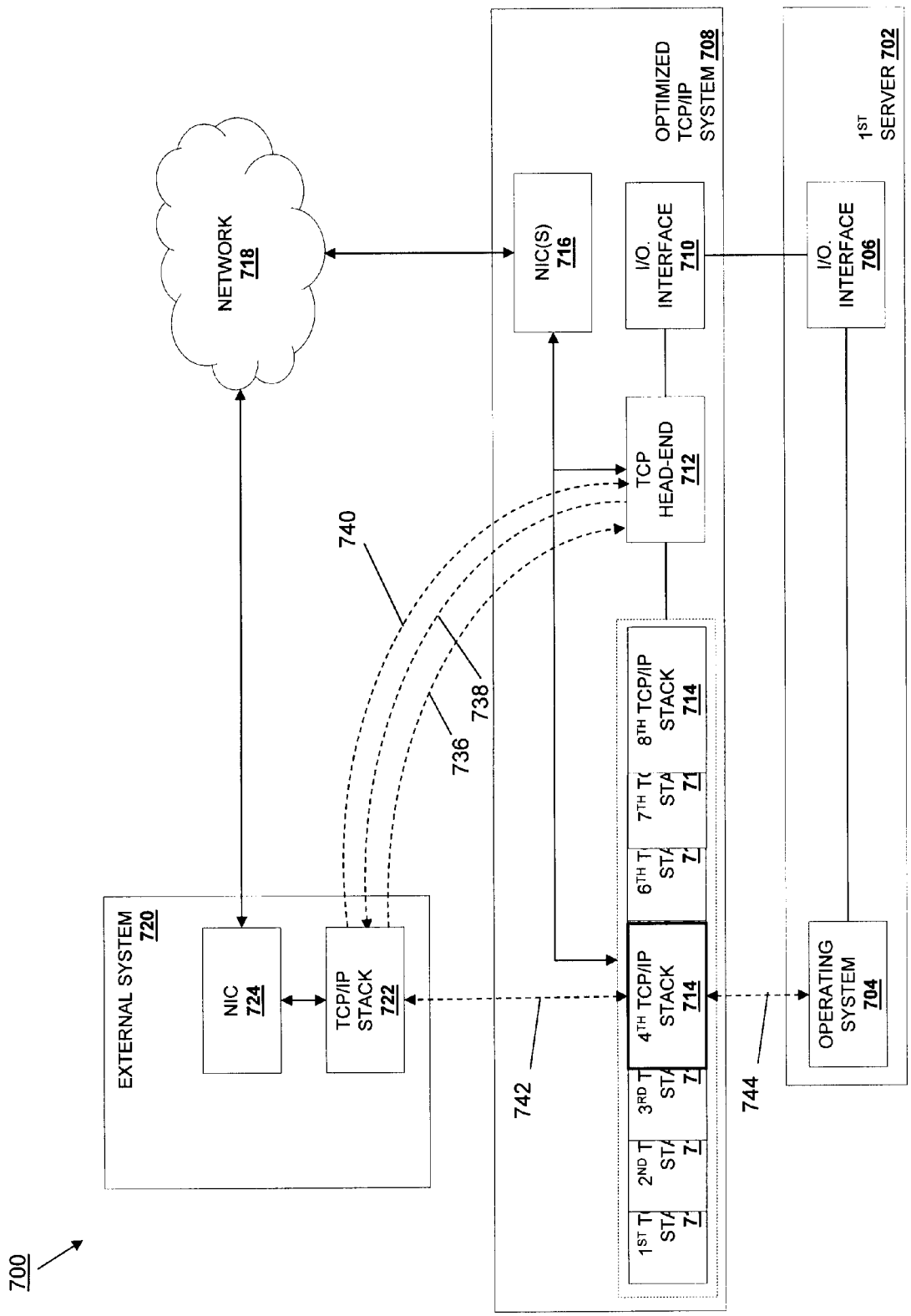
FIG. 7b is a schematic view illustrating an embodiment of a networked system operating according to an embodiment of the method of FIG. 6.

The embodiment of the networked system 700 of FIG. 7b illustrates the situation in which the connection between the external system 720 and the first server 702 is initiated by the external system 720. As illustrated and described above, in this embodiment, the external system requests the 4th optimized TCP/IP stack 714 to handle communications between itself and the first server 702 by sending a SYN packet 736 that identifies the $4^{th}$ optimized TCP/IP stack 714 through the NIC 724, over the network 718, through the NIC 716, and to the TCP head-end 712 (e.g., the TCP/IP stack 722 requests to communicate with the operating system 704 using a TCP/IP stack optimized for iSCSI). In response, the TCP head-end 712 sends a SYN packet 738 identifying the 4th optimized TCP/IP stack 714 (e.g., that is optimized for iSCSI) along with an ACK packet 738 back through the NIC 716, over the network 718, through the NIC 724, and to the TCP/IP stack 722 (e.g., the TCP head-end 712 confirms that a TCP/IP stack that is optimized for iSCSI is available for handling communications). Then, in response to receiving an ACK packet 740 sent from the TCP/IP stack 722, through the NIC 724, through the network 718, and through the NIC 716, the TCP head-end 712 then selects the 4th optimized TCP/IP stack 714, passes connection state variable to the 4th optimized TCP/IP stack 714 and sets the flow path in the optimized TCP/IP system 708 such that the 4th optimized TCP/IP stack 714 handles communication 742 and 744 between the operating system 704 and the TCP/IP stack 722 that occur through the I/O interface 706 and the I/O interface 710, are handled by the 4th optimized TCP/IP stack 714, sent through the NIC 716, over the network 208, through the NIC 724, and to the TCP/IP stack 722, and vice versa.

Thus, systems and methods have been described that split application processing services from network communication services by providing an optimized network communication protocol system that can provide an optimized network communication protocol for different types of communications between a system that processes applications and an external system using those applications. The systems and methods of the present disclosure allow for protocol processing engine (e.g., TCP/IP stack) development, improvement, and application specific improvements to continue in parallel with application development and independent of resources available in the systems that process those applications. Furthermore, the systems and methods of the present disclosure will not interfere with standard generic protocol processing engines (e.g., generic TCP/IP stack communications) as they do not change the TCP state machine, nor do they require recognition of the protocol processing engine identifier in the SYN packet to initiate a connection.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A protocol processing system, comprising:
a first communication interface that is operable to couple to an application processing system;
at least one second communication interface that is operable to couple to a network;
a control head-end that is operable to receive a protocol processing engine identifier in a data field of a first synchronization packet through the at least one second communication interface from an external system over the network; and
a plurality of optimized protocol processing engines coupled to the control head-end, wherein in response to determining that a first optimized protocol processing engine of the plurality of optimized protocol processing engines that is identified by the protocol processing engine identifier is available, the control head-end is operable to send the protocol processing engine identifier in a data field of a second synchronization packet along with a first acknowledge packet and select the first optimized protocol processing engine in response to receiving a second acknowledge packet back from the external system, wherein in response to being selected, the first optimized protocol processing engine handles communications between the application processing system and the external system.

2. The protocol processing system of claim 1, wherein the control head-end is operable to receive the protocol processing engine identifier through the at least one second communication interface from the external system over the network in response to:
receiving, by the control head-end, a request from the application processing system over the first communication interface that includes a requested protocol processing engine and the external system; and
sending the protocol processing engine identifier, by the control-head end, to the external system over the network through the at least one second communication interface.

3. The protocol processing system of claim 2, wherein the protocol processing engine identifier sent by the control-head end to the external system is sent in a data field of a first synchronization packet, and wherein the protocol processing engine identifier received by the control head-end from the external system is received in a data field of a second synchronization packet.

4. The protocol processing system of claim 1, wherein the control head-end being operable to select the first optimized protocol processing engine that is identified by the protocol processing engine identifier includes the control head-end being operable to:
provide a plurality of connection state variables to the first optimized protocol processing engine; and
set a flow path for communications between the application processing system and the external system through the first optimized protocol processing engine.

5. The protocol processing system of claim 1, wherein the at least one second communication interface that is operable to couple to a network includes a plurality of communication interfaces that are operable to couple to a network, and wherein the control head-end is operable to select one of the plurality of second communication interface for use in handling communications between the application processing system and the external system.

6. The protocol processing system of claim 1, wherein the first optimized protocol processing engine is an optimized Transmission Control Protocol/Internet Protocol (TCP/IP) processing engine that receives operating system data through the first communication interface from the application processing system, and sends network communication data through the second communication interface and over the network to the external system.

7. An information handling system (IHS), comprising:
a processing system;

a plurality of communication interfaces coupled to the processing system; and a memory system storing a plurality of optimized protocol stacks, wherein the memory system is coupled to the processing system and includes instructions that, when executed by the processing system, cause the processing system to:

receive a protocol stack identifier in a data field of a first synchronization packet through one of the plurality of communication interfaces;

determine a first optimized protocol stack from the plurality of optimized protocol stacks is available using the protocol stack identifier and, in response, send the protocol processing engine identifier through one of the plurality of communication interfaces in a data field of a second synchronization packet along with a first acknowledge packet; and configure the first optimized protocol stack to handle communications between two of the plurality of communication interfaces in response to receiving a second acknowledge packet back through one of the plurality of communication interfaces.

8. The IHS of claim 7, wherein the memory system includes instructions that, when executed by the processing system, cause the processing system to receive the protocol processing engine identifier through one of the plurality of communication interfaces in response to:

receiving a request over one of the plurality of communication interfaces that includes a requested protocol processing engine and an external system; and sending the protocol processing engine identifier to the external system through one of the plurality of communication interfaces.

9. The IHS of claim 8, wherein the protocol processing engine identifier sent to the external system is sent in a data field of a first synchronization packet, and wherein the protocol processing engine identifier received through one of the plurality of communication interfaces is received in a data field of a second synchronization packet.

10. The IHS of claim 7, wherein the instructions in the memory system that, when executed by the processing system, cause the processing system to determine the first optimized protocol processing engine using the protocol processing engine identifier include instructions that, when executed by the processing system, cause the processing system to:

provide a plurality of connection state variables to the first optimized protocol processing engine; and set a flow path for communications between the two of the plurality of communication interfaces through the first optimized protocol processing engine.

11. The IHS of claim 7, wherein the control head-end is operable to select one of the two of the plurality of communication interfaces for use in handling communications between the two of the plurality of communication interfaces.

12. The IHS of claim 7, wherein the first optimized protocol processing engine is an optimized Transmission Control Protocol/Internet Protocol (TCP/IP) processing engine that receives operating system data through a first of the two of the plurality of communication interfaces, and sends network communication data through a second of the two of the plurality of communication interfaces.

13. A method for network communications, comprising:

receiving a protocol stack identifier in a data field of a first synchronization packet through one of a plurality of communication interfaces;

selecting a first optimized protocol stack from a plurality of optimized protocol stacks that are stored on a non-transitory computer-readable medium using the protocol stack identifier and, in response, sending the protocol stack identifier through one of the plurality of communication interfaces in a data field of a second synchronization packet along with a first acknowledge packet;

configuring the first optimized protocol stack to handle communications between two of the plurality of communication interfaces in response to receiving a second acknowledge packet back through one of the plurality of communication interfaces.

14. The method of claim 13, wherein the receiving the protocol stack identifier through the one of the plurality of communication interfaces is performed in response to:

receiving a request over one of the plurality of communication interfaces that includes a requested protocol processing engine and an external system; and sending the protocol processing engine identifier to the external system over one of the plurality of communication interfaces.

15. The method of claim 14, wherein the protocol stack identifier sent to the external system is sent in a data field of a first synchronization packet, and wherein the protocol stack identifier received through one of the plurality of communication interfaces is received in a data field of a second synchronization packet.

16. The method of claim 13, wherein the selecting the first optimized protocol stack using the protocol stack identifier further includes:

providing a plurality of connection state variables to the first optimized protocol stack; and setting a flow path for communications between the two of the plurality of communication interfaces through the first optimized protocol stack.

17. The method of claim 16, further comprising:

selecting one of the two of the plurality of communication interfaces for use in handling communications between the two of the plurality of communication interfaces.

* * * * *